Aug. 20, 1963  F. ESCHARD  3,101,268
CONTINUOUS PROCESS FOR REDUCING IRON ORES
Filed June 23, 1960  3 Sheets-Sheet 1

INVENTOR
FRANÇOIS ESCHARD

BY *Toulmin & Toulmin*
ATTORNEYS

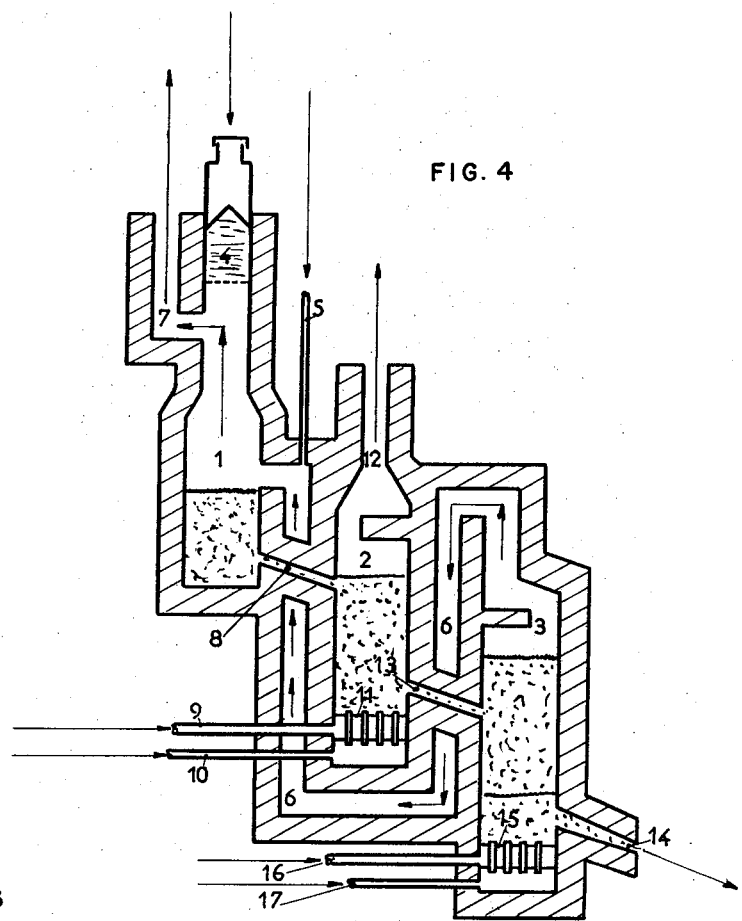

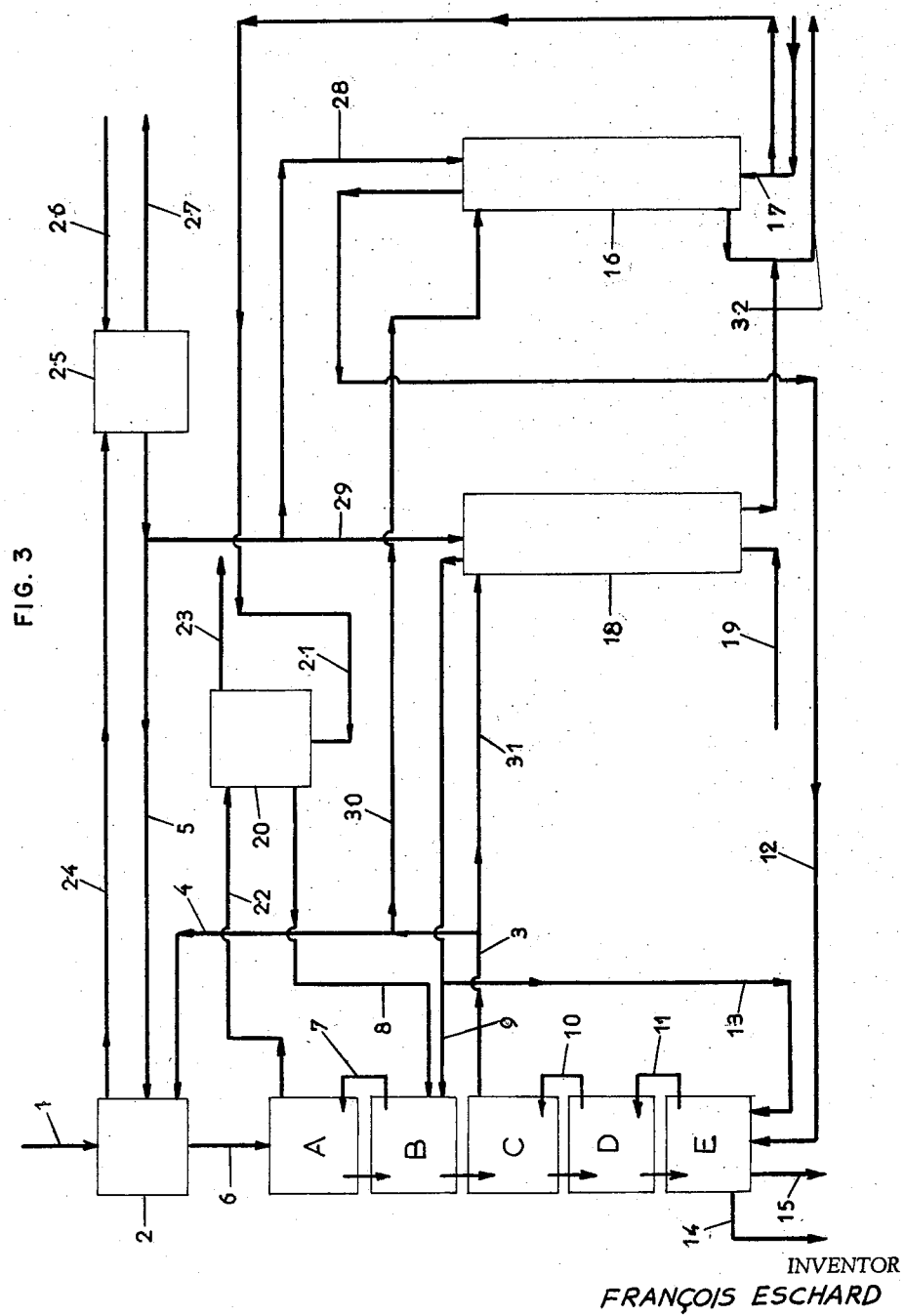

United States Patent Office 3,101,268
Patented Aug. 20, 1963

---

3,101,268
CONTINUOUS PROCESS FOR REDUCING IRON ORES
François Eschard, Croissy-sur-Seine, France, assignor to Institut Francais du Petrole des Carburants et Lubrifiants, Paris, France
Filed June 23, 1960, Ser. No. 38,289
Claims priority, application France June 26, 1959
7 Claims. (Cl. 75—40)

The present invention relates to a continuous process for reducing iron ores in the liquid state by means of a gaseous reducing agent.

It is an object of my invention to provide a process for carrying out in a continuous way a reduction of iron ores, which does not require the use of costly installations and does not result in high amortization costs.

It is another object of my invention to carry out the reduction of iron ores in the liquid state.

It is still another object of my invention to provide a continuous reduction of iron ores or oxides in the liquid state by means of a gaseous reducing agent.

It is a further object of my invention to carry out the reduction of iron ores or oxides in the liquid phase by use of natural gas in relatively low amounts as reducing agent.

It is a still further object of my invention to convert iron ores or oxides to iron on an industrial scale with very high conversion velocities, so as to obtain an iron output per volume unit of the reaction vessel which is of about ten times that obtained in the conventional process of reducing iron ore or oxide in the solid state.

These and other objects as may be apparent from the following specification are achieved according to my invention in a two-stage process for continuously treating iron ores in the liquid phase by means of gaseous reducing agents.

The iron ore to be submitted to this two-stage process is previously brought to its smelting point, which may be achieved by directly contacting the latter with a flame resulting from a complete combustion of gases, solids and/or liquids. Accordingly, it is possible to substantially reduce the amount of heat required during the subsequent reducing steps and, due to the high temperature and the resulting liquid state of the iron ore, to considerably improve the output velocity per volume unit of the reaction vessel. The reducing steps are thereafter carried out in the liquid state.

The oxidation degree of the iron ore or oxide being defined as the ratio of the number of oxygen atoms to the number of iron atoms, either free or in combined form, contained in the iron ore, the first stage of my process consists in reducing said oxidation degree of the iron ore or oxide to a value comprised between 1.0 and 1.2 and preferably between 1.01 and 1.10 so as to avoid any substantial formation of iron during this stage. The oxidation degree of the iron ore may be measured by any known method of dosage of iron oxides, such as for example by dissolving the latter in hydrochloric acid, dosing ferrous ions by means of potassium permanganate, thereafter reducing ferric ions and dosing the total quantity of iron contained in the iron ore in the form of ferrous ions (see Darken and Curry, Journal of American Chemical Society, 67, 1398 (1945) and 68, 798 (1946).

Any other known method, such as physical methods using X-rays, may as well be employed for determining the oxidation degree.

It is the object of the second stage of my process to convert the partially reduced iron ore or oxide, obtained at the end of the first stage, into iron.

Each of these two stages of my process may be carried out in one or more steps consisting in bringing into contact liquid iron oxide with reducing gases, preferably by bubbling the latter through the former.

It is an essential feature of the process according to my invention to maintain the oxidation degree of the iron ore or oxide substantially unchanged during each of said contacting steps.

Though it is possible to use the same reducing gas at each step, it is, however, preferable to apply partially oxidized gases recovered at the end of certain steps for carrying out the reduction of iron ores or oxides of a higher oxidation degree than that of the iron ores or oxides treated in said steps.

According to one particular example of an embodiment of the process of my invention, at least one of the two stages of reduction is carried out in a plurality of steps combined together, so as to supply reducing gases and iron ores or oxides to each of said steps countercurrently.

Said embodiment is preferred to the use of a single step in each stage, since in most cases it results in a considerable decrease in the amount of reducing gases consumed, due to the use of partially oxidized gases recovered at the end of one step for carrying out the reduction of iron ore or oxide of the next following higher degree of oxidation in another step.

However, this advantage of a lower consumption of oxidizing gases must not be considered as the mere effect of an improvement in the effective surface of contact between the gas and the liquid, since is also obtainable by using a single step carried out in a larger reaction vessel or a single reducing step further comprising the recycling of gases within said step.

The process according to my invention may be applied either for treating pure iron ores consisting substantially exclusively of iron derivatives, such as for example iron oxides, or ores containing a gangue consisting of various oxides, the most usual of which are silica, alumina, lime, phosphoric anhydride, magnesia and the like.

However, in the treatment of gangue containing ores it will be convenient to add thereto a flux of the conventional type, the acidic or basic nature of which is selected according to the composition of the gangue.

Reducing gas according to my invention means any gas capable of reducing the oxidation degree of the liquid iron ore and particularly carbon monoxide, hydrogen, hydrocarbons in the form of gases or vapors, said reducing gases being used as such or in admixture with another one, or admixed with gases or vapors which are inert with respect to iron oxide.

Among such reducing gases are to be mentioned particularly natural gas, coke oven gas, water gas, generator gas and the like.

Said gases may also contain a certain proportion of carbonic gas or of steam, but this proportion must always be kept lower than that which would result in the nullification of the reducing power of the gas with respect to iron ore. Such a proportion may be determined on the basis of diagrams representative of the equilibrium between iron and its oxides and other derivatives on one hand and reducing gases CO and $H_2$ on the other hand. Thus, if it is desired to convert iron oxide into iron, substantially quantitatively in the presence of a gangue, there may be tolerated only traces of $CO_2$ and/or $H_2O$ in the gases issued from the reaction vessels and particularly from that in which is carried out the ultimate reduction step. Consequently, in this case it is more advantageous to use hydrocarbons in the form of either gases or vapors as reducing agents.

On the other hand, in the absence of gangue the same conversion may be carried out by means of reducing gases still containing a significant amount of $CO_2$ and/or $H_2O$.

It may in any case be acceptable to use in the first stage of the process a reducing gas having a higher content of $CO_2$ and/or $H_2O$ than that required for the reducing gas used in the second stage. Such a possibility is of particular interest, since it permits to add a certain amount of oxygen or of an oxygen containing gas, such as air, to a reducing gas substantially free from $CO_2$ and/or $H_2O$, so as to achieve a controlled combustion of the same, thereby providing for a supplemental calorie supply as required by the endothermic character of the reaction.

This controlled combustion will lead to the formation of either a certain quantity of $CO_2$ and $H_2O$ or of a gas still having a reducing power, such as CO or $H_2$, like in the case of a controlled combustion of hydrocarbons.

Thus, mixtures of methane and air, for instance, wherein the mole ratio of oxygen to methane is lower than 1.1 will be effective for carrying out a complete reduction of iron ore in the absence of a gangue, whereas in the presence of the latter said ratio must not exceed 0.5 in order to obtain the same result.

It may be of advantage in some cases, particularly when treating iron ore containing a gangue, to use hydrocarbons preheated to a high temperature, for instance above 500° C., as reducing agents. At said temperature the hydrocarbons are partially or entirely cracked.

An increase of the reducing power of the applied gas may also be achieved by suspending therein finely divided particles of carbon or coke.

The lowest temperature at which the reaction may be carried out must in any case be sufficient for bringing the major part of the iron ore of its derivatives to the liquid state. Said temperature is therefore dependent on the composition of the material to be treated.

Thus, for instance, when the treated material consists of an iron oxide substantially free from impurities the temperature must be at least about 1590° C. at the beginning of the reaction and may thereafter decrease to about 1400° C. while the reaction process continues.

According to my invention it is more advantageous, however, to operate under that temperature at which the treated material is entirely in the liquid state. In most cases this condition requires temperatures above 1550–1600° C. at the beginning of the reaction and still more than 1520° C. at the end of the latter, except when the iron further contains carbon in a dissolved state during the final reduction step, which would result in the lowering of the required minimum temperature for maintaining the iron in the liquid state.

The reduction of iron ore in the liquid phase requires an important heat supply in view of bringing the reactants, ore and gases, to the reaction temperature and compensating both, the heat absorption due to the endothermic character of the reduction, and heat losses.

Said heat supply may be provided by external means through a wall, or by inner means, such as an electrical heating system passing throughout the reactants. However, these two ways of supplying heat are very costly and therefore, I prefer in the process of my invention to heat by means of a controlled combustion of reducing gases in the presence of oxygen or of an oxygen containing gas, such as air, as a combustion sustaining agent. This combustion is limited in the reaction vessels to only part of the reducing gases employed, but the gases issuing from said reaction vessels which still possess a certain reducing power may be used for preheating the treated material.

As a consequence of this preferred method of supplying heat not all reducing gases are considered equivalent for carrying out the process of my invention, since they are not to the same extent suitable for both, reducing the iron ore in the liquid state and supplying the heat necessary for the reaction.

Thus, carbon oxide and hydrogen suffer from the drawback of being partially converted by oxidation with oxygen to carbonic gas and water, the presence of which, even in small amounts, may prevent a complete reduction of a gangue containing iron ore. On the other hand, hydrocarbons may be partially oxidized to carbon monoxide and hydrogen with heat release without a substantial formation of $CO_2$ or $H_2O$.

Consequently, the use of hydrocarbons, either in the form of natural gas or of hydrocarbon vapors, is preferred.

The process according to my invention may be carried out in various installations such as, for instance, those corresponding to the flowsheets of the accompanying drawings, wherein:

FIGURE 2 shows a reaction vessel comprising two reaction zones and provided with means for counter-currently bringing into contact liquid iron ore and reducing gases in each of these two reaction zones;

FIGURE 3 is a flowsheet of an arrangement for carrying out the process according to this invention in five steps, each corresponding to a separate reaction zone;

FIGURE 4 shows schematically an embodiment of an apparatus comprising two reaction zones, each of which is fed separately with oxygen and a reducing gas.

Figure 1:
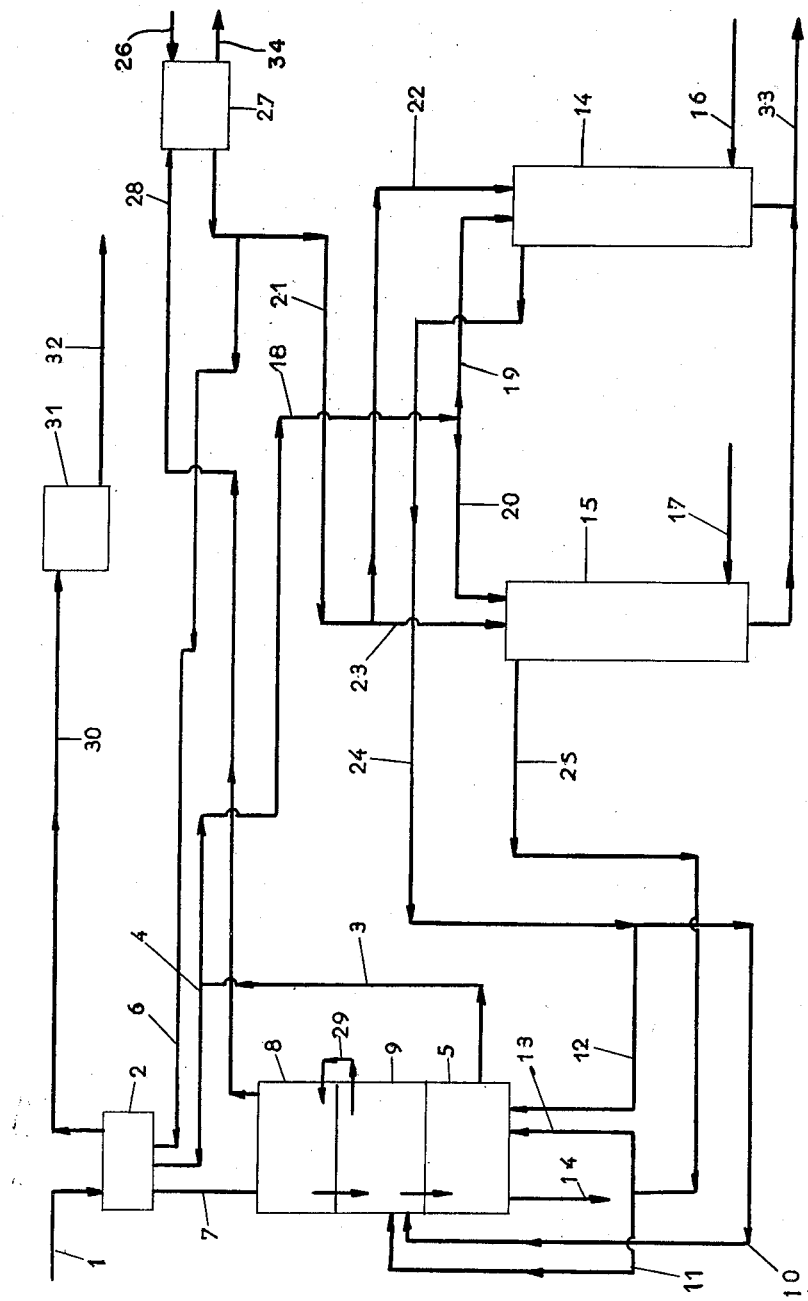
FIGURE 1 is a flowsheet representative of an arrangement comprising three successive reaction zones.

In order that those skilled in the art may better understand the method of my invention and in what manner the same can be effected, the following examples are given with reference to the accompanying drawings. These examples as well as the corresponding drawings are not to be considered as limiting in any way the scope of my invention, since they are only given for illustrative purposes.

All examples relate to the carrying out of the process of my invention in a continuous way. Values and quantities given therein for the various flows of solids, liquids or gases (which are continuous) are those corresponding to the production of one metric ton of iron, the gaseous volumes mentioned being related to normal conditions of temperature (about 20° C.) and pressure (atmospheric).

The reaction zone in which is carried out one particular step of the reaction, e.g. the $n$th step, will be identified hereinafter for the sake of brevity as the $n$th step reaction zone.

*Example 1*

This example, as illustrated in FIGURE 1, relates to the reduction of a very pure iron ore by means of a reducing gas consisting of a mixture of methane and oxygen.

The iron ore (1,450 kg.) consisting substantially exclusively of $Fe_2O_3$, is discharged from conveyor 1 into the refractory furnace 2, wherein it is smelted by means of the heat produced by the combustion of reducing gases (1427 m.$^3$) already brought to high temperature, issuing through pipes 3 and 4 from the reaction zone 5 and being brought into contact with 457 m.$^3$ of oxygen brought to a temperature of about 1000° C. and delivered by pipe 6. The smelted iron, brought to a temperature close to 1600° C., passes through pipe 7 in the first-step reaction zone 8.

It is thus conveyed counter-currently with respect to the flow of reducing gases issued through pipe 29 from the second-step reaction zone 9.

In the first-step reaction zone 8 the oxidation degree of the iron oxide (i.e. the ratio of the number of oxygen atoms combined with iron to the number of iron atoms) is kept substantially unchanged at a value of about 1.12 to 1.16 and in most cases of 1.14.

The iron ore then passes to the second-step reaction zone 9, wherein it is brought into contact with methane (75 m.³), brought to a temperature of 500° C., and oxygen (60.5 m.³), brought to 1000° C., delivered by pipes 10 and 11, respectively. The stationary oxidation degree of iron in the second-step reaction zone 9 is generally in the range of from 1.010 to 1.015 and in most cases it has a value of 1.012.

The liquid flows out from the reaction zone 9 into the third-step reaction zone 5, wherein it is brought into contact with methane (530 m.³), brought to 500° C., and oxygen (345 m.³), brought to 1000° C., delivered through pipes 12 and 13, respectively. During this third step the liquid is subdivided into two distinct phases consisting of an upper layer of oxidized iron (having an oxidation degree, as heretofore defined, of about 1.01) and a lower layer of iron, respectively, which latter one is withdrawn either continuously or periodically through pipe 14.

The preheating of methane and oxygen used in the second and third-step reaction zones 9 and 5 is carried out in two heat exchangers of the conventional type, 14 and 15, fed on the one hand with methane and oxygen at normal temperature through pipes 16 and 17, and on the other hand with the hot combustible gas issued from the reaction zone 5 through pipes 18, delivering 163 m.³, 19, delivering 89.5 m.³ and 20, delivering 73.5 m.³.

The combustion of said gas with oxygen, brought to about 1000° C., delivered by pipes 21 (53 m.³), 22 (29 m.³) and 23 (24 m.³) provides the necessary calories for said preheating.

Methane, brought to a temperature of about 500° C., issues through pipe 24 and oxygen, at a temperature of about 1000° C., through pipe 25.

The preheating to a temperature of about 1000° C. of oxygen delivered through pipes 6 and 21 is achieved in a set of conventional heat exchangers 27, using the heat released by the hot gases issued from the first-step reaction zone 8 and conveyed through pipes 28 (225 m.³), to heat fresh oxygen (510 m.³), introduced thereinto through pipe 26, to this desired temperature.

The residual heat energy of gases, issued from the smelting unit 2 through pipe 30 and from exchangers 14, 15 and 27 through pipes 33 and 34, may be recovered for heating purposes or for producing energy. Thus, the hot gases, for instance, issuing through pipe 30 from the smelting unit 2, may be used in a heat exchanger 31, either as such or after combustion, for producing hot steam under pressure which may serve for operating a steam generating station.

The cooled gases are then evacuated through pipe 32.

It clearly appears from the foregoing that the gas consumption inside the reaction zones is particularly low, the overall methane consumption being 605 m.³, delivered through pipe 24, and the oxygen overall consumption being 405 m.³, delivered through pipe 25. In comparison herewith the reduction of iron ore carried out in one single step in the liquid phase would have required a consumption of 822 m.³ of methane and 577 m.³ of oxygen.

*Example 2*

This example, also illustrated in FIGURE 1, relates to the reduction of the same iron ore as treated according to Example 1, but this reduction is carried out by means of air instead of oxygen. Furthermore, the heat exchanger 31 as well as pipe 32 have been suppressed, the hot gases issuing from furnace 2 through pipe 30 being forwarded together with hot gases issuing from pipe 28 to the preheater 27.

The iron ore is reduced under substantially the same general conditions as in Example 1, oxygen being merely replaced by air. However, the consumption of methane and oxygen (contained in air) is higher than in the preceding example.

The following table summarizes the gas volumes supplied through the different pipes (said volumes being those corresponding to normal temperature and pressure conditions as referred to above):

| Supplying pipe | Nature of the gas | Volume of gas supplied (m.³) |
|---|---|---|
| 3 | combustible gas | 5,317 |
| 4 | do | 3,785 |
| 18 | do | 1,532 |
| 19 | do | 321 |
| 20 | do | 1,210 |
| 10 | methane | 178 |
| 12 | do | 861 |
| 16 and 24 | do | 1,039 |
| 11 | air | 439 |
| 13 | do | 3,418 |
| 17 and 25 | do | 3,857 |

*Example 3*

The same iron ore as treated according to Example 1 is reduced under the same general conditions, except that the first-step reaction zone 8 and the corresponding pipe 29 are suppressed, the pipes 7 and 28 being connected to the reaction zone 9, which is functioning in the same way as the entirety of the two reaction zones 8 and 9 in Example 1, except that the degree of oxidation of iron in this single step is close to 1.05. Furthermore, like in Example 2, the exchanger 31 and the corresponding exhaust pipe 32 are suppressed, the hot gases issuing from furnace 2 through pipe 30 being supplied, together with hot gases issuing from pipe 28, to the preheater 27.

In the following table the gas volumes supplied through the different pipes (volumes corresponding to normal conditions of temperature and pressure) are summarized:

| Supplying pipe | Nature of the gas | Volume of gas supplied (m.³) |
|---|---|---|
| 3 | combustible gas | 1,620 |
| 10 | methane | 102 |
| 12 | do | 540 |
| 16 and 24 | do | 642 |
| 11 | oxygen | 81 |
| 13 | do | 350 |
| 17 and 25 | do | 431 |

*Example 4*

Example 3 is repeated, except that the oxidation degree of iron in the reaction zone 9 is kept at a value of about 1.1. Thus, the methane and oxygen consumptions are lower, as shown in the following table:

| Supplying pipe | Nature of the gas | Volume of gas supplied (m.³) |
|---|---|---|
| 3 | combustible gas | 1,710 |
| 10 | methane | 56 |
| 12 | do | 570 |
| 16 and 24 | do | 626 |
| 11 | oxygen | 45 |
| 13 | do | 365 |
| 17 and 25 | do | 410 |

*Example 5*

According to this example the same iron ore as treated according to Example 1 is reduced by means of methane and oxygen, but this reduction is carried out in a reaction vessel comprising two reaction zones associated to one another so as to provide a complete counter-current between the reducing gases and the smelted iron ore. FIGURE 2 is illustrative of such a reaction vessel comprising two reaction zones 1 and 2. The smelted iron ore is discharged through pipe 3 and methane and oxygen are supplied through pipes 4 and 5, respectively. In each step reaction zone the composition of the liquid remains substantially unchanged during the reaction, the degree of oxidation of the iron ore in the first-step reaction zone 1 being higher than 1. The gases pass from the second to the first-step reaction zone through pipe 6, whereas smelted iron ore flows in the opposite direction. The smelted iron is recovered through pipe 7, whereas non-reacted gases are evacuated through pipe 8.

The amount of gases used for carrying out the reduction process are as follows:

| Supplying pipe | Nature of the gas | Volume of gas supplied (m.³) |
| --- | --- | --- |
| 4 | methane | 652 |
| 5 | oxygen | 420 |
| 8 | combustible gas | 1,956 |

*Example 6*

This example, illustrated in FIGURE 3, is concerned with the reduction, by means of methane and oxygen, of an impure iron ore of the same kind as that of Tindouf having the respective contents of: 79.4% of $Fe_2O_3$, 6.2% of $SiO_2$, 0.1% of $Mn_2O_3$, 6.4% of $Al_2O_3$, 1.38% of $P_2O_5$, 0.9% of CaO, 4.1% of $H_2O$ and 1.52% of various impurities.

The reaction vessel comprises 5 reaction zones in the two first of which (A and B) is carried out the first stage of the reaction, whereas the three others (C, D and E) are destined to the second reaction stage.

The iron core (1800 kg.) having added thereto 125 kg. of lime which are required for carrying out a complete smelting of the iron ore, is discharged from the conveyor 1 to the refractory furnace 2, wherein this solid phase is smelted and brought to a high temperature by means of the heat freed by the combustion of part of the reducing gas (881 m.³) issued from the reaction zone C and delivered through pipes 3 and 4, said combustion being carried out by means of 283 m.³ of oxygen, preheated to a temperature of about 1000° C. and delivered through pipe 5.

The burnt gases are evacuated through pipe 24 while smelted materials, brought to a temperature of about 1600° C., are supplied through pipe 6 to the first reaction zone A. Said smelted materials are countercurrently brought into contact with the reducing gas issuing from the reaction zone B through pipe 7. In the reaction zone A the degree of oxidation of iron in the liquid phase (ratio of the number of oxygen atoms combined with iron to the number of iron atoms) remains substantially stationary at a value of about from 1.12 to 1.16 and in most cases of 1.14. The liquid phase contains per each iron atom 0.103 mole of $SiO_2$, 0.06 mole of $Al_2O_3$ and 0.141 mole of CaO. The average composition of gases issuing from the reaction zone A is the following:

Percent by volume
$CO_2$ _____ 33.3
$H_2O$ _____ 66.6

The liquid phase is then transferred to the second reaction zone B, wherein it is brought into contact with methane (75 m.³), brought to a temperature of 500° C., and oxygen (60.5 m.³), preheated to 1000° C., supplied through pipes 8 and 9, respectively.

The degree of oxydation of iron in the reaction zone B is generally in the range of from 1.012 to 1.015. The liquid phase therein still contains per each iron atom 0.103 mole of silica, 0.06 mole of alumina and 0.141 mole of lime.

The average composition of gases issuing from the reaction zone B is the following:

Gases: Volume percent of total gas
    CO _____ 28.5
    $CO_2$ _____ 5.0
    $H_2$ _____ 28.5
    $H_2O$ _____ 38.0

The liquid phase of reaction zone B is then transferred to the next reaction zone C, where it is brought into contact with gases issuing from the reaction zone D through pipe 10. This liquid phase is thus separated in two phases, one of them consisting of substantially pure iron and the other one containing per each 0.85 mole of FeO 0.103 mole of silica, 0.06 mole of alumina and 0.141 mole of lime.

The average composition of gases issuing from reaction zone C (about 1,100 m.³) is the following:

Gases: Volume percent of total gas
    $H_2$ _____ 28.3
    CO _____ 38.9
    $H_2O$ _____ 27.8
    $CO_2$ _____ 5.0

The liquid iron thus obtained may be directly withdrawn at the bottom of the reaction zone C, as it is also the case for the following reaction zones D or E. It may also be transferred to the following reaction zones in which case the overall amount of liquid iron produced in the different reaction zones is withdrawn at the bottom of the last reaction zone (as shown in FIGURE 3).

The liquids are then transferred to the reaction zone D, wherein they are brought into contact with a gas stream issuing from the reaction zone E through pipe 11. In this reaction zone there are two liquid phases, one consisting of substantially pure iron and the other one comprising per each 0.185 mole of FeO 0.103 mole of silica, 0.06 mole of alumina and 0.141 mole of lime.

The average composition of the gases issuing from reaction zone D is as follows:

Gases: Volume percent of total gas
    $H_2$ _____ 44.0
    CO _____ 29.5
    $H_2O$ _____ 22.0
    $CO_2$ _____ 4.5

The liquids are then transferred to the reaction zone E, where they are brought into contact with a gaseous flow resulting from oxygen (136 m.³), preheated to 1000° C., supplied through pipe 13, and cracked methane consisting essentially of carbon and hydrogen (680 m.³) brought to the same temperature and supplied through pipe 12.

In the reaction zone the liquid phase of the gangue is substantially free from iron oxide and may be withdrawn either continuously or periodically through pipe 14.

The liquid iron, which is heavier than the gangue, forms a separate layer at the bottom of the reaction zone E and may be withdrawn continuously or periodically through pipe 15.

The average composition of the gaseous flow issuing from the reaction zone E is the following:

Gases: Volume percent of total gas
    CO _____ 33.3
    $H_2$ _____ 66.6

The preheating and cracking of the methane supplied through pipe 12 are carried out in the heat exchanger 16, fed with cold methane (about 340 m.³) through pipe 17.

The oxygen is preheated in exchanger 18 together with oxygen supplied to reaction zone B through pipe 9. Said exchanger is fed with cold oxygen through pipe 19.

The methane supplied to reaction zone B through pipe 8 is preheated in furnace 20, fed with cold methane (75 m.³) through pipe 21, by means of the heat evolving from the hot gases issuing from reaction zone A through pipe 22. Said gases, after having transferred their heat, are evacuated through pipe 23.

Heat is provided to exchangers 16 and 18 by combustion of one part of the reducing gases issuing from reaction zone C through pipe 3 and supplied to said exchangers through pipes 30 and 31, respectively, said combustion being carried out by means of oxygen preheated to 1000° C., supplied through pipe 28 and 29. The burnt gases are evacuated through pipe 32.

The preheating of oxygen from the ordinary temperature to 1000° C. is carried out in exchanger 25, fed with cold oxygen through pipe 26 by means of heat produced by the combustion gases issuing from furnace 2 and supplied to said exchanger through pipe 24. Said combustion gases are thereafter evacuated through pipe 27.

It results from the foregoing that the consumption of methane and oxygen is particularly low, the overall amount of methane consumed being at the most 415 m.$^3$ and that of oxygen being lower than 200 m.$^3$. In comparison herewith the reduction of the same iron ore in the liquid phase in a single-step reaction vessel would have required a consumption as high as 2,602 m.$^3$ of methane and 1,020 m.$^3$ of oxygen.

*Example 7*

Example 6 is repeated, except that reaction zone D is suppressed, reaction zones C and E being directly connected to one another.

The amounts of gases used for carrying out the process are higher, as shown in the following table:

| Supplying pipe | Nature of the gas | Gas volume, (m.$^3$) |
|---|---|---|
| 3 | combustible gas | 1,215 |
| 8 | methane | 75 |
| 12 | cracked methane | 810 |
| 17 | methane | 405 |
| 9 | oxygen | 60.5 |
| 13 | do | 160 |

Furthermore, while the oxidation degree of iron in the other reaction zones A, B and E is the same as according to Example 6, the oxidation degree in reaction zone C falls down to a value of 0.215.

*Example 8*

Example 7 is repeated, except that reaction zone A is further suppressed as well as pipe 7, pipes 6 and 22 being directly connected to reaction zone B. The amounts of gases used are as follows:

| Supplying pipe | Nature of the gas | Gas volume, (m.$^3$) |
|---|---|---|
| 3 | combustible gas | 1,215 |
| 8 | methane | 292 |
| 17 | do | 405 |
| 12 | cracked methane | 810 |
| 9 | oxygen | 232 |
| 13 | do | 160 |

The oxidation degree in the various reaction zones is the same as according to Example 6.

*Example 9*

This example relates to the complete reduction, by means of hydrogen, of substantially pure iron oxide in the liquid phase, in two stages comprising the use of external heating means, such as that resulting from the combustion of one part of the reducing gas issuing from the second stage reaction zone.

Each of the two stages is carried out in a single-step reaction zone as in Example 3.

The hydrogen consumption reaches 330 m.$^3$ in the first stage (corresponding to a decrease in the oxidation degree of the iron oxide to 1.015 and 930 m.$^3$ in the second stage (corresponding to the conversion into iron of the iron oxide having an oxidation degree of 1.015).

The total amount of hydrogen consumed is therefore 1,260 m.$^3$. In comparison herewith the reduction of the same liquid iron oxide in a single-stage process would require a hydrogen consumption of 1,470 m.$^3$.

*Example 10*

Example 9 is repeated, except that the first stage of the reaction is carried out in two steps in which hydrogen and liquid iron oxide are contacted counter-currently while the second stage is carried out in a single step.

Thus, the hydrogen consumption reaches 146 m.$^3$ in the first stage and 930 m.$^3$ in the second stage, which corresponds to an overall consumption of 1,076 m.$^3$.

*Example 11*

This example relates to a two-stage reduction of pure iron oxide by means of carbon monoxide, the heat necessary for the reaction being produced by a controlled combustion of 6.6 percent of this latter gas inside the reaction vessel.

The consumption of carbon oxide during the first stage is 286 m.$^3$ when this stage is carried out in a single step and of 161 m.$^3$ when this stage is carried out in two steps. The consumption of carbon oxide during the second stage amounts to 5,470 m.$^3$.

In comparison herewith the reduction of the same oxide in a single stage would have required 7,400 m.$^3$ of carbon oxide.

The preceding examples are illustrative of the advantages provided by the liquid phase reduction process carried out in two stages according to the invention as compared with the corresponding single-stage process, the principal advantages consisting in a considerable decrease in the consumption of reducing gas.

It also clearly appears from the foregoing that the various reducing gases are not equivalent for carrying out the reduction of iron ore in the liquid state according to this invention.

Methane, as well as other hydrocarbons proved to be the best reducing agents, since they provide for a complete reduction of iron ore without being consumed in excessive amounts, even if the latter contains a gangue.

On the contrary, the reducing gases comprising essentially carbon oxide and/or hydrogen have an insufficient reducing power for providing for a complete extraction of iron contained in a gangue containing iron ore, particularly when heating is achieved by a direct controlled combustion of the reducing gases. Hydrogen, however, possesses a higher reducing power for carrying out the reduction of iron ore than carbon monoxide and mixtures of hydrogen with carbon monoxide.

The method of practicing the invention results from the foregoing description. The liquid iron oxides, either pure or in admixture with a gangue, are continuously passed through the successive reaction zones, while a continuous flow of reducing gases is supplied to each of said reaction zones.

FIGURE 4 illustrates one of the embodiments of an apparatus which may be employed for carrying out the reduction process according to my invention, although many other types of apparatus may as well be used for this purpose.

According to this particular embodiment of an apparatus shown in FIGURE 4, the respective flows of liquids and gases circulate in the same way as in Example 3, hereabove described, concerning the treatment of a pure iron oxide carried out in two stages, each of which is separately fed with reducing gas.

This apparatus consists essentially of three furnaces 1, 2 and 3, an iron oxide feeding system 4, and pipes for transferring gases and liquids.

Iron oxide in small grains is introduced into furnace 1, where it comes into contact with a flame resulting from the combustion by means of oxygen, preheated to 1000° C. and supplied through pipe 5, of gases issuing from furnace 3 and transferred through pipe 6. The iron oxide is thus brought to its smelting temperatures and droplets formed assemble in the lower part of furnace 1, while the combustion gases are supplied through pipe 7 to the heat exchangers.

The liquid is continuously transferred from furnace 1 through immersed pipe 8 to furnace 2, wherein the oxidation degree has a stationary value of 1.05.

The liquid is continuously stirred by means of the gaseous flow consisting originally of a mixture of methane with oxygen, provided through pipes 9 and 10, respectively, and diffused through tubes, such as tube 11, of the same type as those conventionally used in Bessemer or Thomas converters.

Gases issuing from furnace 2 through pipe 12 are supplied to the heat exchangers.

The liquid is continuously transferred through immersed pipe 13 to furnace 3 containing two separate liquid phases, the upper one consisting of a liquid iron oxide having an oxidation degree of about 1.01 and the lower one of a liquid iron, which is continuously withdrawn through pipe 14.

Methane and oxygen, supplied through pipes 16 and 17, are diffused into furnace 3 by means of a set of tubes 15 of the same kind as tubes 11 of furnace 2.

The spatial speed of transfer of the liquids is dependent on the diameter of the transferring pipes as well as on the level difference between the liquid phases in the different furnaces, although the flow of liquids from one furnace to another may be controlled by regulating means provided in combination with said transferring pipes.

It will be understood that this invention is susceptible to further modification and, accordingly, it is desired to comprehend such modifications within this invention as may fall within the scope of the appended claims.

What I claim is:

1. A continuous process for reducing iron ores in the liquid state by means of reducing gases, comprising at least one step of a first stage, of bubbling reducing gases through molten iron ores having a ratio of the number of oxygen atoms combined with iron to the number of iron atoms in the range of from 1.0 to 1.2, fed with smelted crude iron ore at a substantially constant rate of the iron contained therein; at least one step of a second stage of bubbling oxygen and reducing gases, the major part of which consists of methane, through fused iron, fed with said molten iron ores at the same substantially constant rate of the iron contained therein, the molar ratio of oxygen to methane being at most 1.1; and withdrawing liquid iron at said constant rate.

2. A continuous process according to claim 1, comprising more than two reducing steps, wherein the partially oxidized reducing gases issuing at the end of one given step are countercurrently brought into contact, in another preceding step, with iron ore of a higher oxidation degree than that of the iron ore treated in said given step, whereby a partial reduction of the iron ore treated in said preceding step is obtained.

3. A continuous process according to claim 1, wherein oxygen is used in the form of air.

4. A continuous process for reducing iron ores in the liquid state by means of reducing gases, comprising at least one step of a first stage, of bubbling reducing gases through molten iron ores having a ratio of the number of oxygen atoms combined with iron to the number of iron atoms in the range of from 1.01 to 1.10, fed with smelted crude iron ore at a substantially constant rate of the iron contained therein; at least one step of a second stage of bubbling oxygen and reducing gases the major part of which consists of methane, through fused iron, fed with said molten iron ores at the same substantially constant rate of the iron contained therein, the molar ratio of oxygen to methane being at most 1.1; and withdrawing liquid iron at said constant rate.

5. A continuous process for reducing iron ores in the liquid state by means of reducing gases, comprising at least one step of a first stage, of bubbling reducing gases through molten iron ores having a ratio of the number of oxygen atoms combined with iron to the number of iron atoms in the range of from 1.0 to 1.2, fed with smelted crude iron ore at a substantially constant rate of the iron contained therein; at least one step of a second stage of bubbling oxygen and natural gas, through fused iron, fed with said molten iron ores at the same substantially constant rate of the iron contained therein, the molar ratio of oxygen to methane being at most 1.1; and withdrawing liquid iron at said constant rate.

6. A continuous process for reducing iron ores in the liquid state by means of reducing gases, comprising at least one step of a first stage, of bubbling reducing gases through molten iron ores having a ratio of the number of oxygen atoms combined with iron to the number of iron atoms in the range of from 1.0 to 1.2, fed with smelted crude iron ore at a substantially constant rate of the iron contained therein; at least one step of a second stage of bubbling oxygen and reducing gases the major part of which consists of methane, through fused iron, fed with said molten iron ores at the same substantially constant rate of the iron contained therein, the molar ratio of oxygen to methane being at most 0.5; and withdrawing liquid iron at said constant rate.

7. A continuous process for reducing iron ores in the liquid state by means of reducing gases, comprising at least one step of a first stage, of bubbling oxygen and reducing gases through molten iron ores having a ratio of the number of oxygen atoms combined with iron to the number of iron atoms in the range of from 1.0 to 1.2, fed with smelted crude iron ore at a substantially constant rate of the iron contained therein; at least one step of a second stage of bubbling oxygen and reducing gases the major part of which consists of methane, through fused iron, fed with said molten iron ores at the same substantially constant rate of the iron contained therein, the molar ratio of oxygen to methane being at most 1.1; and withdrawing liquid iron at said constant rate.

References Cited in the file of this patent
UNITED STATES PATENTS 1,796,871    Madorsky _____ Mar. 17, 1931